(12) United States Patent
Reichelt

(10) Patent No.: US 6,444,962 B1
(45) Date of Patent: Sep. 3, 2002

(54) HEATING ARRANGEMENT WITH COATED RADIATION EMITTING SURFACES

(75) Inventor: Helmut Reichelt, Dresden (DE)

(73) Assignee: Molekulare Energietechnik AG (DE)

( * ) Notice: Subject to any disclaimer, the term of this patent is extended or adjusted under 35 U.S.C. 154(b) by 0 days.

(21) Appl. No.: 09/830,437

(22) PCT Filed: Oct. 9, 1999

(86) PCT No.: PCT/EP99/07583

§ 371 (c)(1),
(2), (4) Date: Apr. 25, 2001

(87) PCT Pub. No.: WO00/25552

PCT Pub. Date: May 4, 2000

(30) Foreign Application Priority Data

Oct. 27, 1998 (DE) .......................................... 198 49 432

(51) Int. Cl.[7] .............................. H05B 6/02; H05B 6/64

(52) U.S. Cl. ........................ 219/634; 219/730; 219/759; 219/678

(58) Field of Search ................................ 219/759, 730, 219/678, 679, 728, 729, 702, 715, 634

(56) References Cited

U.S. PATENT DOCUMENTS 5,340,428 A * 8/1994 Kodokian .................... 219/634
5,410,135 A * 4/1995 Pollart et al. ................ 219/759

FOREIGN PATENT DOCUMENTS

DE          197 14 299 A1    8/1998

* cited by examiner

Primary Examiner—Philip H. Leung
(74) Attorney, Agent, or Firm—McNair Law Firm, P.A.

(57) ABSTRACT

The invention relates to a heating arrangement that is characterized by a combination of the following features: the heating arrangement consists of at least one heating element (3) in the form of a flat element with two opposite-lying, essentially parallel conductors and a coating arranged therebetween for the generation of electromagnetic waves. The coating material is comprised of a binding agent, an insulating agent, a dispersion agent, water and graphite. The heating device also comprises a control device (7) with a harmonic generator containing an electric component that has a rapid rate of current rise and is suitable for generating a high harmonic content. The harmonic generator is coupled to both electric conductors of the heating element (3) in order to emit a spectrum of vibrations in natural molecular frequency ranges. A low-cost, highly effective heating system is thus provided.

14 Claims, 2 Drawing Sheets

HEATING ARRANGEMENT WITH COATED RADIATION EMITTING SURFACES

FIELD OF THE INVENTION

The invention relates to a heating arrangement or system employing electromagnetic radiation.

BACKGROUND

A method and device for changing the temperature of a discrete material is already known (EP 0 777 524 B1) and can in particular be used to increase the temperature of a discrete material, i.e. for heating purposes.

The method for increasing the temperature of the discrete material uses a large surface area transmitting antenna by means of which electromagnetic radiation of a frequency in the same order of magnitude as the natural molecular frequency of the discrete material to be heated is emitted, without this frequency being a modulated carrier frequency. The discrete material to be heated is placed in the emission field of the transmitting antenna whereby a natural molecular frequency resonance is created in the discrete material leading to a heating of that material. By locating the device in a closed space that besides the discrete material is also filled with a medium, this medium can also be included in the mutual resonance interaction for the purpose of heating by selecting a suitable emission spectrum.

A suitable device for implementing the above method comprises a large surface area transmitting antenna that is limited on one side by a first supply line and on the other side by a second supply line made from a good electrically conductive material. The supply lines are connected to a generator for the production of radiation energy and the discrete material to be heated is brought into the emission field of the transmitting antenna. The frequency emitted by the transmitting antenna lies in the range of the natural molecular frequency of the discrete material and/or of the liquid or gaseous medium located in the defined space.

Through the mutual interaction of the large surface area transmitting antenna serving as emitter and the material in the range of the resonance frequency, a high efficiency in the heating system is achieved in particular as a result of band resonances.

It is object of the invention to create a heating arrangement that utilizes the above method for the most part and enhances the device in such a way that an easily constructed and economically viable arrangement, with further gains in the effectiveness of the heating system, is obtained.

SUMMARY OF THE INVENTION

This problem mentioned above is solved by the features of the invention. According to the invention the heating arrangement consists of a combination of the following features:

The heating arrangement consists of at least one heating element in the form of a flat element with two opposite-lying electric conductors and a coating therebetween comprising a coating material for radiation surfaces to produce electromagnetic waves, composed of binding agent, insulating agent, dispersing agent, water and graphite, characterized in that the coating material has the following composition:

a. 55 to 65% amount of substance (mole fraction) of a base material comprising:
  39 to 49% amount of substance binding agent,
  18 to 23% amount of substance insulating agent,
  18 to 24% amount of substance dispersing agent,
  12 to 16% amount of substance distilled water.

b. 35 to 45% amount of substance graphite, the composition of the binding agent being:
  64 to 79% amount of substance distilled water,
  4 to 6% amount of substance sulfated oil,
  0.16 to 0.24% amount of substance phenols or
  0.05 to 0.5% amount of substance benzoisothiazolinon,
  15 to 19% amount of substance casein,
  0.8 to 1.2% amount of substance urea,
  2 to 3% amount of substance alkali diluent,
  2.5 to 3.5% amount of substance caprolactam; and, whereby by means of the coating material from the insulating agent, the graphite and the binding agent electromagnetic waves can be emitted. This can be attributed to the formation of dipoles within the coating material. By using the specified coating made of the special coating material a heating arrangement of particularly high efficiency is obtained.

DESCRIPTION OF THE INVENTION

The binding agent contains distilled water as the main component to ensure, dependent on the quantity added, an at least viscous consistency of the binding agent. In this way the individual components of the binding material can be mixed together well.

The sulfated oil, and a flow-control agent if present, act as a solvent intermediary and bring about a uniform and stable distribution of the individual substances in the binding agent as well as good film formation of the coating material on the substrate.

The phenols or benzoisothiazolinon contained in the binding agent, even in small quantities, promote the addition of particles.

Casein can be regarded as the binding agent in the binding agent and enables the individual components to be taken up within the binding agent.

Urea, too, is used as a solvent intermediary in the binding agent i.e. it promotes an even distribution of the individual components in the binding agent.

The binding agent also contains a diluent functioning as an homogenizer as well as caprolactam as a structural component.

The main component of the base material is the binding agent in which the particles of the insulating agent, as one part of the electric dipole, accumulate. The dispersing agent aids the dispersion process and thereby an even distribution of the binding agent, including the insulator particles, within the base material. The distilled water mixed into the base material serves to liquefy the base material.

The graphite and its individual particles added during mixing of the coating material also deposit themselves in the binding agent, to which the insulator is already bound, and in conjunction with the insulating agent form a large number of microscopic electric dipoles, evenly distributed within the coating material. The graphite can be added in a milled state with very small particle size. This further promotes an even distribution of the graphite in the coating material and therefore the creation of a large number of electric dipoles. A high degree of radiation with regard to the generation and emission of electromagnetic radiation can thereby be achieved with this coating material. In particular this enables a frequency emission in the range of the natural molecular frequency of the material to be heated, as well as a correspondingly suitable frequency for a liquid or gaseous medium also located in the room, to be emitted.

For this high frequency excitation we propose a harmonic generator containing an electrical component which when driven with a driving frequency displays a rapid rate of current rise corresponding to a steep leading edge and is therefore suitable for producing a high harmonic content, for example up to the fiftieth harmonic oscillation.

The harmonic generator is coupled to both electric conductors of the heating element to excite the heating element in order to emit a spectrum of vibrations in natural molecular frequency ranges, preferably as band resonance ranges in the terahertz range.

The sulfated oil can for example be sulfated olive oil, sulfated sesame oil or sulfated palm oil. According to one aspect of the invention, the sulfonate oil of preference is however sulfated ricinus oil, commonly known as sulforicinate or Turkey red oil. This sulfated ricinus oil is especially well suited on account of its interlace-active properties.

According to another aspect of the invention, the phenols of preference are carbonized phenols, produced by cracking, which demonstrate particular suitability with respect to the addition of particles. The preferred alternative to phenols is benzoisothiazolinon.

According to another aspect of the invention, the diluent is a solvent based on aromatics and/or alcohol and/or ester and/or ketone, e.g. terpene.

A large variety of common insulators can be used as insulating agent. According to yet another aspect of the insulating agent of preference is however an insulating soot. It is advantageous if the soot is added in the milled state with a very small particle size. This promotes an even distribution of the soot in the base material and therefore the overall formation of a multitude of electric dipoles in the coating material.

According to another aspect of the invention, the dispersing agent, for easier dispersion and therefore an even distribution of the binding agent including insulator particles in the base material, is an organic, monomeric and/or polymeric substance.

According to a further aspect of the invention, the coating material in its preferred composition contains a thixotropy agent. This thixotropy agent ensures that the coating material displays a viscous consistency i.e. is easily spreadable when applied to a radiation surface, but is sufficiently viscous when at rest such that no drops or tears can form on the surface. In this way the coating material can be applied to a radiation surface and will follow its outline exactly.

As a particularly suitable electrical component for the production of a high harmonic content we propose, a triac preferably displaying a ramp angle between 87° and nearly 90° for one phase angle. Other known electrical components having similar characteristics along with their known electronic driving components, for example a dual MOSFET, could also be used.

In this regard it should be noted that electrical components of this kind with such rapid rates of current rise and thereby such a high harmonic content are unsuitable for operation in conventional power networks specifically because of their high harmonic content. The present overall arrangement of such a harmonic generator in conjunction with at least one connected heating element leads however to a damping of the high harmonic content as a result of the excitation in the heating element. The overall arrangement is therefore operable in conjunction with a conventional power network without the risk of mains contamination with high harmonic content.

By this means, in particular through configuring a harmonic generator for high-frequency excitation in this manner, an overall highly cost-effective heating arrangement with regard to the required components is obtained. A further considerable cost advantage from such a heating arrangement results from the extremely low installation costs and the low space requirements in comparison to known hot-air and hot water heating systems, as well as through the extremely low operating costs.

The invented heating arrangements are therefore suitable for all possible heating purposes, in particular in public and private buildings, whereby the low space requirements and the possibility of a hidden arrangement open up considerable scope for architectural design possibilities.

In a concrete embodiment of a heating element, it is proposed that each of the electric conductors on the heating element be formed by copper foil strips. The electrical contact with the coating could occur by means of direct application or embedding and constitutes a capacitive and/or inductive coupling of the two.

To enable the heating element, to be adjusted for different room circumstances and changing temperature conditions, it is easily possible to control and/or regulate the effect through changing the amplitude and/or the frequency of the driving oscillations using known electronic control devices.

The base material of the heating element could be stable and plate-shaped resulting in panel-like heating elements which could for example be fitted using conventional wall fasteners. It would however also be possible to construct the base material as a kind of wallpaper which can then be glued to a wall.

Dimensioning and adapting the invented heating arrangement is easy to carry out, for example, several heating elements in the form of a flat element could be combined in a visually pleasing manner and in a compact arrangement. To keep the effects of line capacitance as small as possible, the supply lines should preferably be kept short.

The heating arrangement is advantageous for use as a room heater in living spaces, commercially used rooms and public rooms, e.g. in churches. Furthermore the heating arrangement is particularly suitable for drying rooms, e.g. for drying chambers of painting facilities or for drying wood, whereby the energy usage can be considerably reduced in comparison to conventional heaters.

According to a still further aspect of the invention, the base material or material parts thereof, or adjacent or connected materials, could however also be selected so as to be excitable through natural molecular frequencies and are thereby directly heatable in a particularly effective manner.

In yet another embodiment, a tube-shaped base, preferably coated on the outside and possibly also on the inside, can be used to heat up a liquid displaying natural molecular frequencies contained within. In particular this enables a simply constructed continuous flow heater that can be operated with little energy expenditure, e.g. a water continuous flow heater, to be manufactured.

DESCRIPTION OF THE DRAWINGS

The invention will now be described in more detail with the aid of the drawings.

They show.

DETAILED DESCRIPTION

Figure 1:
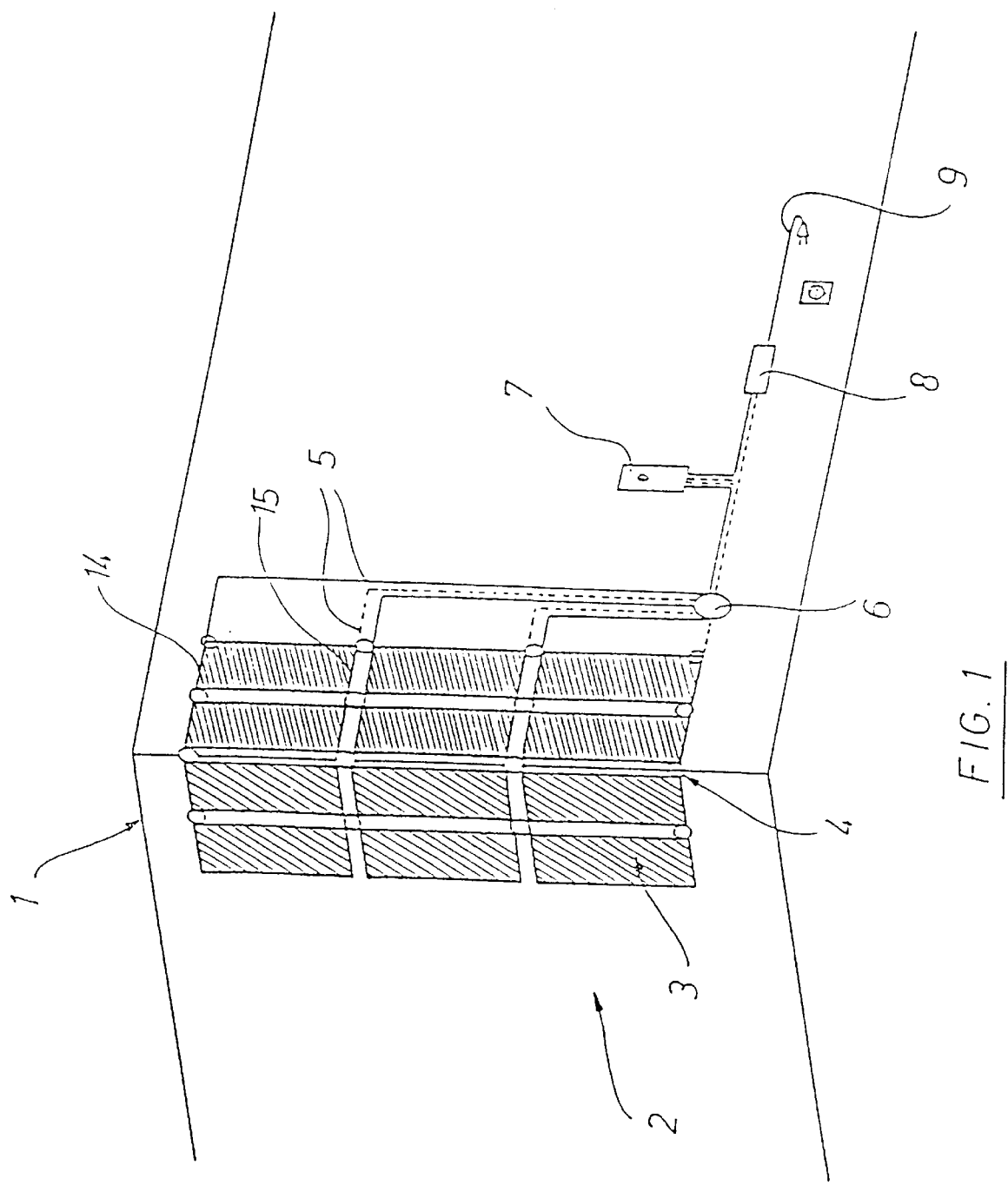
FIG. 1 which is a perspective view of a heating arrangement as a room heater; and, FIG. 2 which illustrates a driving circuit.

FIG. 1 shows a perspective view of the corner of a room 1 in which has been installed a heating arrangement 2. Here the heating arrangement 2 consists of a combination of twelve heating elements 3 grouped symmetrically into horizontal groups of four heating elements each in the corner of the room 1. The heating elements 3 are constructed as rectangular flat elements and are joined together in parallel by their respective narrow sides at the connection points 4. The heating elements 3 could comprise either plate-shaped base material or a rollable base material whereby that material would either be screwed or glued on as appropriate. Three vertical, edge elements 3 are connected to one another through connecting cables 5 via a junction box 6 and to the other heating elements 3 or their electric conductors 14, 15 in the form of copper foil strips via the parallel connections 4.

Figure 2:
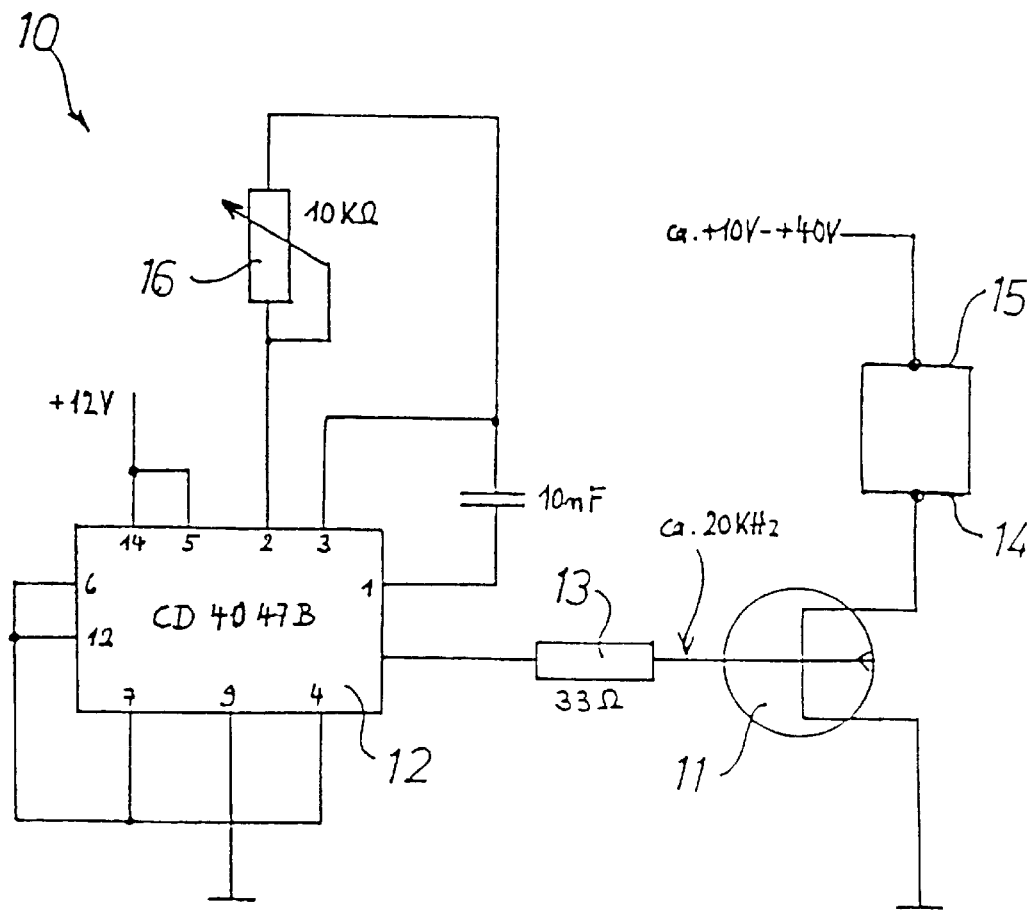

The control device 7 contains in particular a harmonic generator with for example a triac that has a rapid rate of current rise as well as a controller or regulator of the oscillation amplitudes. The control device 7 is connected via a junction box 6 to the heating elements 3 on the one hand, and is supplied with power via a transformer 8 and via a mains connection 9 on the other hand. FIG. 2 shows a concrete driving circuit 10 of the control device 7 with a dual MOSFET 11.

Using a multi vibrator 12 as an integrated semiconductor circuit (Type CD 4047 B), the dual MOSFET 11 is driven with an already relatively high frequency of approx. 20 kHz via a resistor 13. The multi vibrator 12 is wired in the manner shown in FIG. 2. Contained within the circuit of the dual MOSFET are one (schematically represented) heating element or rather its electrical, opposite-lying electric conductors 14, 15 in the form of copper foil strips. The amplitude and frequency of the driving oscillations for the dual MOSFET can be adjusted in the range of approximately Ueff 20 V to 30 V and 18 kHz to 22 kHz by means of a potentiometer 16 connected to the multi vibrator 12 thereby allowing the heating energy and thus the heating effect to be controlled.

The rapid rate of current rise of the dual MOSFET 11 plays a decisive role in the functioning of the device and the emission of a spectrum of vibrations in natural molecular frequency ranges, whereby the high harmonic content thus produced is effective up to about the fiftieth harmonic oscillation.

A similarly functioning electrical circuit to that shown in FIG. 2 can be constructed using a triac. While the dual MOSFET 11 is already being driven by means of a relatively high frequency in the range of 20 kHz, a triac can be driven directly by a mains frequency of approx. 50 Hz in an essentially similar functioning circuit. Having thus described my invention, I claim.

What is claimed is:

1. A heating arrangement, comprising a combination of the following features:
   a) at least one heating element (3) in the form of a flat element with two opposite-lying electric conductors and a coating arranged therebetween comprising a coating material for radiation surfaces to produce electromagnetic waves, composed of binding agent, insulating agent, dispersing agent, water and graphite, characterized in that the coating material has the following composition
      i) 55 to 65% amount of substance (mole fraction) of a base material comprising:
      ii) 39 to 49% amount of substance binding agent, 18 to 23% amount of substance insulating agent
      iii) 18 to 24% amount of substance dispersing agent, 12 to 16% amount of substance distilled water,
   b. 35 to 45% amount of substance graphite, the composition of the binding agent being:
      i) 64 to 79% amount of substance distilled water
      ii) 4 to 6% amount of substance sulfated oil; 0.16 to 0.24% amount of substance phenols or 0.05 to 0.5% amount of substance benzoisothiazolinon;
      iii) 15 to 19% amount of substance casein; 0.8 to 1.2% amount of substance urea;
      iv) 2 to 3% amount of substance alkali diluent;
      v) 2.5 to 3.5% amount of substance caprolactam; and,
   whereby by means of the coating material from the insulating agent the graphite and the binding agent electromagnetic waves can be emitted,
   c) at least one controller/regulator (7) with a harmonic generator comprising an electrical component which when driven by a driving oscillation displays a rapid rate of current rise corresponding to a steep leading edge and thereby being suitable for the production of a high harmonic content; and,
   d) the harmonic generator is coupled to both electric conductors of the heating element (3) for the excitation of said element (3) in order to emit a spectrum of vibrations in the natural molecular frequency ranges.

2. A heating arrangement according to claim 1 wherein the sulfonated oil is sulfated ricinus oil.

3. Heating arrangement according to claim 1 wherein the phenols are carbonized phenols produced by cracking or benzoisothiazolinon is used.

4. Heating arrangement according to claim 1 wherein the diluent is a solvent based on aromatics and/or alcohol and/or ester and/or ketone.

5. Heating arrangement according to claim 1 wherein the insulating agent is an insulating soot.

6. Heating arrangement according to claim 1 wherein the dispersing agent is an inorganic and/or organic, monomeric and/or polymeric substance.

7. Heating arrangement according to claim 1 wherein the coating material contains a thixotropy agent.

8. Heating arrangement according to claim 1 wherein the electrical component is a triac and/or a dual MOSFET with associated, known electronic driving components.

9. Heating arrangement according to claim 1 wherein the electric conductors on the heating element (3) take the form of copper foil strips essentially arranged in parallel and the electrical contact with the coating constitutes a capacitive and/or inductive coupling, whereby said coating lies either below or above the copper foil strips or the latter is embedded in the coating.

10. Heating arrangement according to claim 1 wherein the heating effect can be controlled and/or regulated by varying the amplitude and/or the frequency of the driving oscillations.

11. Heating arrangement according to claim 1 wherein the base material of the heating element (3) is in a stable plate-like form or is rollable as a kind of wallpaper.

12. Heating arrangement according to claim 1 wherein several heating elements (3) are used as flat elements, whereby all flat elements exhibit like rectangular areas and are connected in parallel in a symmetrical arrangement-preferably using short supply lines.

13. Heating arrangement according to claim 1 wherein the base material itself, or material parts within or adjacent and connected to it, can, be excited and thereby heated by natural molecular frequencies.

14. Heating arrangement according to claim 1 wherein the base material is tube-shaped and is a component of a liquid heater, whereby the liquid can be poured into and/or passed through the tube.

* * * * *